Patented Apr. 8, 1952

2,592,195

UNITED STATES PATENT OFFICE 2,592,195

HETEROCYCLIC NITROGEN COMPOUNDS

George Schwarz, Rochester, N. Y., and Polydoor Frans De Smet, Wilrijk-Antwerp, Belgium, assignors to Gevaert Photo-Producten N. V., Mortsel-Antwerp, Belgium, a company of Belgium No Drawing. Application August 29, 1947, Serial No. 771,401. In Great Britain December 20, 1939

13 Claims. (Cl. 260—302)

This invention relates to the preparation of heterocyclic compounds, which are suited as starting materials for the preparation of dyestuffs.

It is an object of this invention to provide the preparation of new heterocyclic compounds.

Another object of this invention is to provide these heterocyclic compounds.

The invention consists in the method of preparing these compounds by heating together a heterocyclic compound containing a tertiary nitrogen atom and in the alpha-position to this nitrogen atom a methyl group, such as a derivative of thiazole, selenazole, pyridine, benzothiazole or naphthothiazole, with a dihalogen alkylene corresponding to the formula:

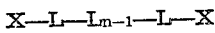

wherein

X represents a halogen atom,
n represents a positive integer of from 1 to 2,
L represents a member selected from the group consisting of methylene or substituted methylene, and the methylene hydrogens may be substituted, and optionally treating the product with a salt containing an acid radical other than a halide, for instance a perchlorate.

Examples of dihalogen alkylenes which may be used in this reaction are ethylene bromide and trimethylene bromide.

The reaction is so easy that it takes place by simple heating.

The halogen atoms introduced into the product of this reaction by the dihalogen alkylene, have an ionic character, so that they are easily replaced by other acid radicals, merely by treatment with a solution of a salt the anion of which is to replace the halogen ion.

The preparation of dyestuffs from these compounds is the object of our co-pending application for "methine dyestuffs and their manufacture" (Ser. No. 771,402).

Moreover the compounds prepared according to the invention possess stabilizing properties for photographic silver halide emulsions.

Example 1

15 g. of 2-methylbenzthiazole are heated together with 22 g. of trimethylene bromide during six hours with a reflux condenser in an oil bath at 160°–170° C. After cooling, the resulting product is treated with ether, to remove impurities, and then dried under reduced pressure. The product is thus obtained in a yield of about 23 g. It may be purified by extracting it with ethyl alcohol, boiling the alcoholic solution with animal charcoal and after evaporating the alcohol, recrystallizing it from ethyl alcohol. The white product thus obtained has a melting point of 250°.

Determination of Br: 30.1 per cent.

Example 2

20 g. of 2-methyl-3-4-benzobenzthiazole are heated together with 20 g. of ethylene bromide for six hours with a reflux condenser in an oil bath at 160°–170°.

After cooling the resulted product is treated with ether or acetone and dried under reduced pressure.

The product is thus obtained in a yield of about 28 g. It may be purified by extracting it with ethyl alcohol, boiling the alcoholic solution with animal charcoal and after evaporating the alcohol, recrystallizing it from ethyl alcohol. The slightly brown product thus obtained has a melting point of about 220° with decomposition.

Determination of Br: 26.5 per cent.

Example 3

20 g. of 2-methyl-3-4-benzobenzthiazole are heated together with 22 g. of trimethylene bromide for three hours with a reflux condenser in an oil bath at 160°–170°. After cooling, the resulting product is treated with acetone and dried under reduced pressure. The product is thus obtained in a yield of 30 g. It may be purified by extracting it with ethyl alcohol, boiling the alcoholic solution with animal charcoal and after evaporating the alcohol, recrystallizing it from ethyl alcohol. The slightly grey product thus obtained has an unsharp melting point at nearly 200°. Determination of Br: 25.5 per cent.

Example 4

10 g. 2-5-dimethyl-1-3-4-thiodiazole corresponding to the formula:

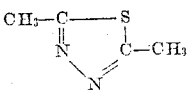

and 6.5 g. ethylenebromide are heated up together for 72 hours on an oil bath at 100° C., washed with ether and recrystallized from acetone. Melting point is 155°.

It is to be understood that our invention is not limited to the above examples, but is susceptible of many modifications within the scope thereof,

We claim:

1. The process which comprises reacting a heterocyclic nitrogen base containing a five to six-membered heterocyclic ring, said ring having a reactive group which enters into a cyanine dye condensation in a position taken from the group consisting of alpha and gamma positions to the heterocyclic nitrogen atom with a polyfunctional organic hydrocarbon compound containing at least one non-aromatic carbon atom and a plurality of functional groups, each of which is attached to such non-aromatic carbon atom and forms quaternary ammonium salts with ternary nitrogen compounds, at least one mol of said base being used for each functional group.

2. The process which comprises reacting at least two mols of a heterocyclic nitrogen base containing a five to six-membered heterocyclic nitrogen ring, said ring having a reactive group which enters into a cyanine dye condensation in a position taken from the group consisting of alpha and gamma positions to the heterocyclic nitrogen atom with about one mol of a bifunctional organic hydrocarbon compound containing at least one non-aromatic carbon atom and two functional groups attached to such carbon atom, each of which forms quaternary ammonium salts with ternary nitrogen compounds.

3. The process which comprises reacting at least two mols of a heterocyclic nitrogen base containing a five to six-membered heterocyclic nitrogen ring, said ring having a reactive group which enters into a cyanine dye condensation in a position taken from the group consisting of alpha and gamma positions to the heterocyclic nitrogen atom with about one mole of an alkylene dihalide.

4. Process for preparing compounds which are suited as starting materials for the preparation of dyestuffs, which comprises heating together a member selected from the group consisting of 5- and 6-membered heterocyclic compounds and the same kind of compounds having an arylene group bonded to them, said member containing a tertiary nitrogen atom and in the alpha-position to this nitrogen atom a methyl group with a dihalogen alkylene corresponding to the formula:

$$X-CH_2(-CH_2)_{n-1}-CH_2-X$$

wherein:

X represents a halogen atom
$n$ = a positive integer of from 1 to 2

5. Process for preparing compounds which are suited as starting materials for the preparation of dyestuffs, which comprises heating together a member selected from the group consisting of 5- and 6-membered heterocyclic compounds and the same kind of compounds having an arylene group bonded to them, said member containing a tertiary nitrogen atom and in the alpha-position to this nitrogen atom a methyl group with a dihalogen alkylene corresponding to the formula:

$$X-CH_2(-CH_2)_{n-1}-CH_2-X$$

wherein:

X represents a halogen atom
$n$ = a positive integer of from 1 to 2 and treating the product with a salt containing an acid radical other than a halogen.

6. Process for preparing a heterocyclic compound, which comprises heating together 2-methylbenzthiazole and trimethylene bromide.

7. Process for preparing a heterocyclic compound, which comprises heating 2-methyl-3:4-benzobenzthiazole and ethylene bromide.

8. Process for preparing a heterocyclic compound, which comprises heating 2:5-dimethyl-1:3:4-thiodiazole and ethylene bromide.

9. The condensation product of a member selected from the group consisting of 5- and 6-membered heterocyclic compounds and the same kind of compounds having an arylene group bonded to them, said member containing a tertiary nitrogen atom and in the alpha-position to this nitrogen atom a methyl group, with a dihalogen alkylene corresponding to the formula:

$$X-CH_2(-CH_2)_{n-1}-CH_2-X$$

wherein:

X represents a halogen atom, while
$n$ represents a positive integer of from 1 to 2 the condensation product corresponding to the probable formula

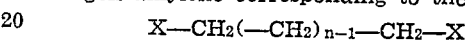

wherein Y represents the non-metallic atoms necessary to complete a member selected from the group consisting of 5- and 6- membered heterocyclic compounds and the same kind of compounds having an arylene group bonded to them, while X represents a halogen atom, and $n$ represents a positive integer of from 1 to 2.

10. The condensation product of 2-methyl benzthiazole and trimethylene bromide corresponding to the probable formula:

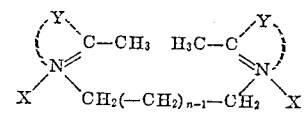

11. The condensation product of 2-methyl-3:4-benzobenzthiazole and ethylene bromide corresponding to the probable formula:

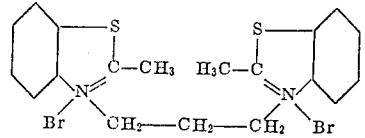

12. The condensation product of 2:5-dimethyl-1:3:4-thiodiazole and ethylene bromide corresponding to the probable formula:

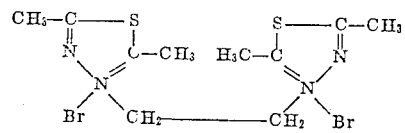

13. A quaternary salt of a heterocyclic nitrogen base containing two to three heterocyclic nitrogen nuclei, each of which has a five to six-membered heterocyclic nitrogen ring and contains a reactive group which enters into a cyanine dye condensation, in a position taken from the group consisting of alpha and gamma positions to the heterocyclic nitrogen atom and has a salt-forming anion attached to each such nitrogen atom.

GEORGE SCHWARZ.
POLYDOOR FRANS DE SMET.

REFERENCES CITED

The following references are of record in the file of this patent:

UNITED STATES PATENTS

| Number | Name | Date |
|---|---|---|
| 2,418,748 | Bavley | Apr. 8, 1947 |
| 2,425,774 | Wilson | Aug. 19, 1947 |